June 23, 1942.   F. KOCHER   2,287,179
FLUID PRESSURE CONTROLLED WINDSHIELD WIPER
Filed March 1, 1939   6 Sheets-Sheet 1

INVENTOR:
FREDERICK KOCHER.
By Grover C. Hill,
ATTORNEY.

June 23, 1942. F. KOCHER 2,287,179
FLUID PRESSURE CONTROLLED WINDSHIELD WIPER
Filed March 1, 1939 6 Sheets-Sheet 3

INVENTOR:
FREDERICK KOCHER:
By Grover L. Hill,
ATTORNEY.

Patented June 23, 1942

2,287,179

UNITED STATES PATENT OFFICE 2,287,179

FLUID PRESSURE CONTROLLED WIND-SHIELD WIPER

Frederick Kocher, Wilkinsburg, Pa., assignor to Earnest E. Fehlman, Detroit, Mich.

Application March 1, 1939, Serial No. 259,085

16 Claims. (Cl. 121—164)

This invention relates to improvements in the art of the turbine type of motors or engines or more particularly to windshield appliances adapted for motor vehicles.

One of the objects of the invention is to provide a windshield wiper that is exclusively operated by the pressure resultant from the oil within the feed line of an internal combustion engine.

Another object of the invention is to provide a device in coordination with a vehicle engine having a fluid pressure lubricating system with a source of suction power and a source of pressure power, and these powers coacting in a manner so as to withdraw de-energized fluid from the windshield wiper.

The invention may be operated by any fluid under pressure, such as air, water or steam obtained from any suitable storage tank.

An object of the invention is to provide a means by which the rear window of the motor vehicle may also be operated by fluid pressure, by adapting a similar wiper unit.

A further object of this invention is to provide a motor for a windshield wiper which will not slow down or stall, or otherwise vary its speed upon the imposition of a heavy load upon the automobile engine. This stalling is a common defect in conventional vacuum types now in use and provides a source of great annoyance and often danger. The herein disclosed device will drive the wiper plates at a constant and unvarying speed under all conditions of driving.

A further object of the invention is to provide a windshield wiper motor that not only will not stall under conditions of load placed upon the automobile engine, but which will operate at a constant and unvarying speed under all such conditions. A further object of the invention is to provide a windshield wiper motor that is simple of construction, sturdy and dependable in operation and not subject to annoying or dangerous variations in speed.

With the foregoing in mind, it will become readily apparent that the invention possesses further advantages, all of which will be clearly revealed during the course of the following detailed description, illustrated throughout the accompanying drawings, and more fully pointed out in the appended claims.

With reference to the drawings:

Figure 13 is a side elevation of the valve shifting carriage unit.

In further carrying out my disclosure, it is understood that certain elements described and illustrated as directly associated therewith but no part thereof, will be designated by consecutive alphabetical letters; while the invention proper will be characterized by the customary reference numerals.

Figures 1, 3:
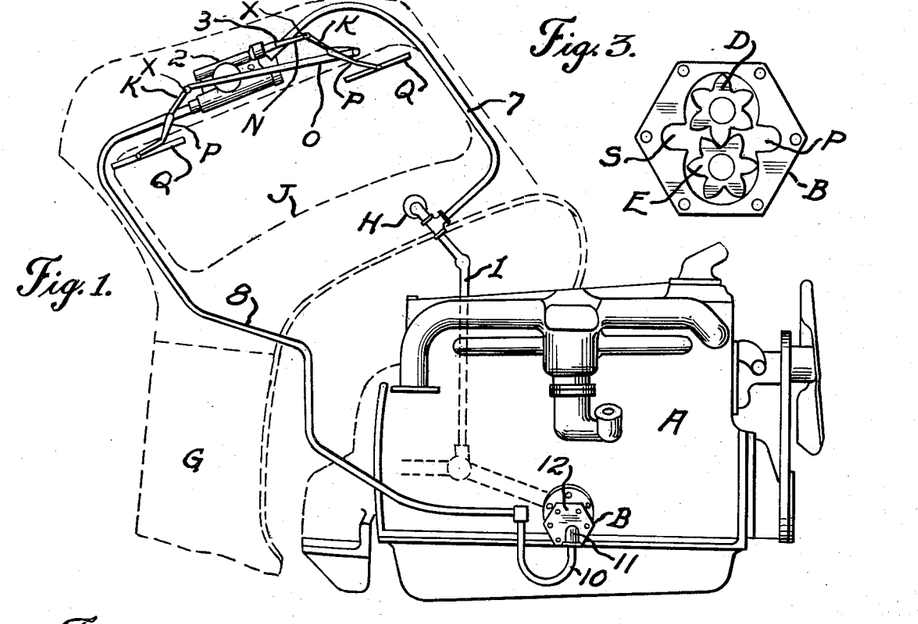
Figure 1 is a side elevation of a typical motor vehicle power plant, a portion of the front of the vehicle body indicated by dotted lines and the complete device contemplated by this invention shown with the wiper mechanism mounted over the windshield.
Figure 3 is a view showing the circulation pump with cover thereof removed.
Figure 2:
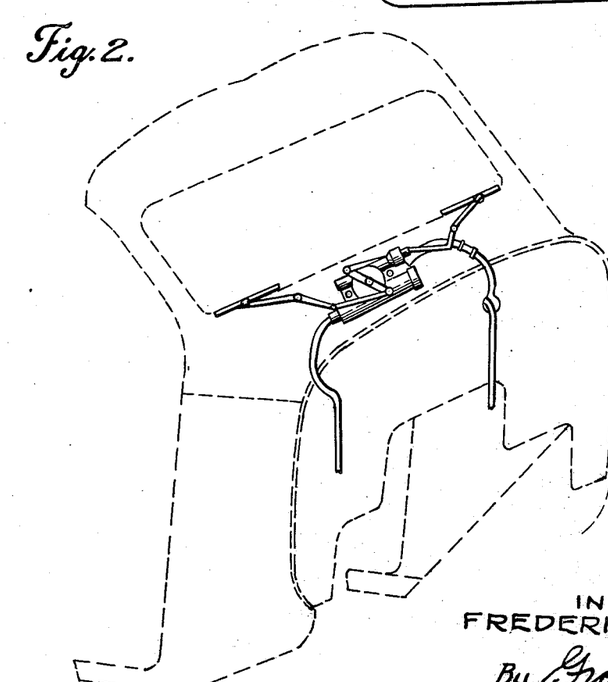
Figure 2 is a dotted outline similar to a portion of Figure 1, but showing the motor contemplated by this invention and the wiper mechanism mounted below the windshield.

Referring to Figure 1 in which appears typical vehicle power plant A having the customary circulating pressure lubricating system, comprising pump B with suction port S which is connected to oil storage through a passage leading thereto and which is within the lower portion of said power plant, so as to force oil under pressure by means of gears D and E. The oil then enters feed port P, and from it enters the feed line within the engine. Obviously the lubricating system of the engine is equipped with the usual pressure relief unit (not shown) and the same operates in the usual manner to regulate the oil pressure in the lubricating system of the engine. Likewise, it will similarly regulate the oil pressure effectively reaching the herein described windshield wiper motor.

Pressure line 1 is connected to the pressure fluid channels of the lubricating system within the engine A leading to vehicle body G and also connects with oil pressure gauge H upon the instrument panel of said body.

Figure 4:
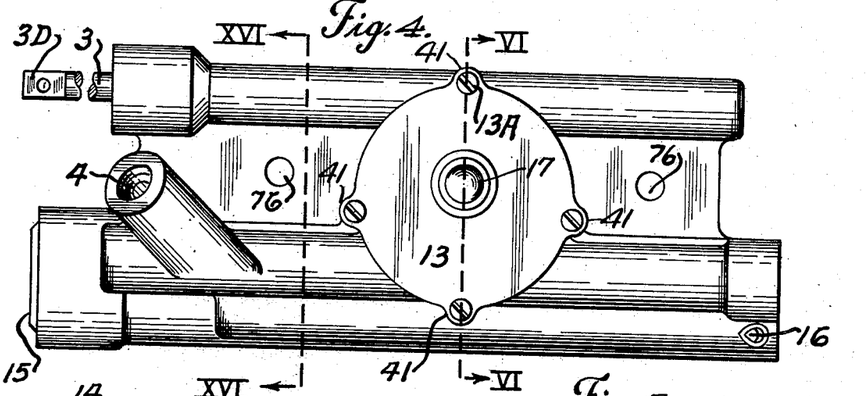
Figure 4 is a rear elevation assembly of the power unit of the device.

Referring to Figures 1 and 4 it follows that power unit 2 is secured in any approved manner with the use of apertures 76 therein to the deck of body G above windshield J, and has movably disposed power transmitting member or ram 3 pivotally secured to levers K by means of link N thereby oscillating plate arms P through connecting link O. Plate arms P are pivoted at one end to wiper shafts at X and at the other end to wiper plates Q. The method just described for connecting the power unit with the windshield wiper unit is by way of example only and may be replaced by any other conventional method.

The power unit has extended boss 4, having internal threads 5 and intake port 6, (Figures 15 and 17) and pressure line 7 (Fig. 1) engages said threaded portion and connects with oil line 1.

The oil return line 8 connects with internally threaded portions 9 (Fig. 15) of the power unit. It is also connected with tubular loop 10 so as to bring the returning oil below the level of the feed intake S in pump B. Loop 10 connects with fitting 11 of pump cover 12 and leading to feed intake S of pump B within the circulating lubrication system of engine A. The connection for pressure line 7 may be made at any suitable junction in feed line between pump and pressure relief valve within lubricating system used for internal combustion engines.

The loop 10 is provided of rubber or other suitable material to conduct the oil from the de-energized side of the wiper motor to a point below the intake of the oil pump. This provides a sump which assists to prevent the noise of the pump gears from traveling along said pipe to the header of the vehicle body, and also provides a sump for the retention of oil when the wiper motor is stopped by which the starting of said motor after a period of non-use is improved.

During the continuous stage when engine 1 is in operation the oil flows under pressure and is fed from oil pressure line 1 and delivered to the intake of power unit 2 continuously so long as there is suction in line 8, thus power unit 2 is operated by force developed by pressure of oil admitted through said intake in coaction with suction in return line 8.

Figure 7:
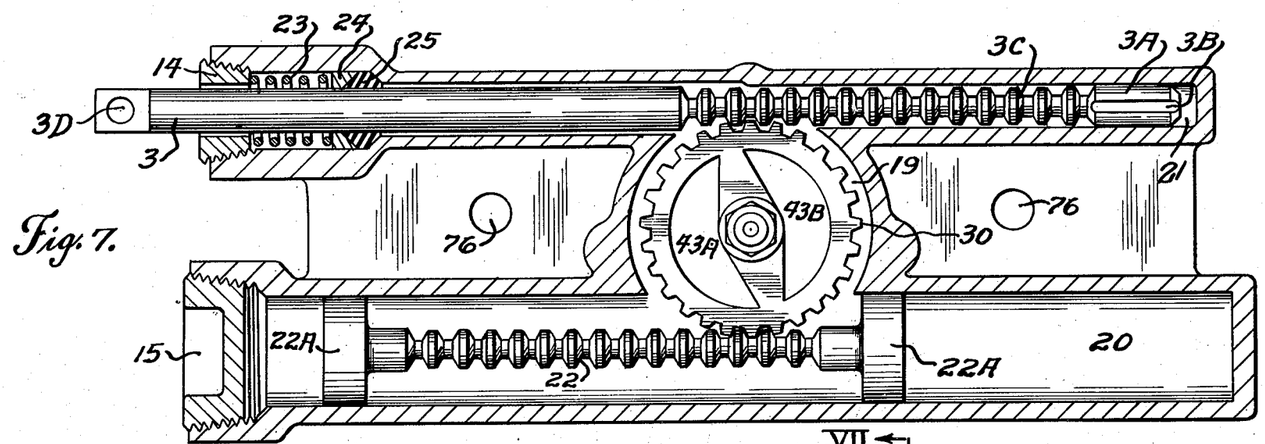
Figure 7 is a longitudinal section taken upon line VII—VII of forthcoming Figure 9 and looking in the direction of the arrows.
Figure 8:
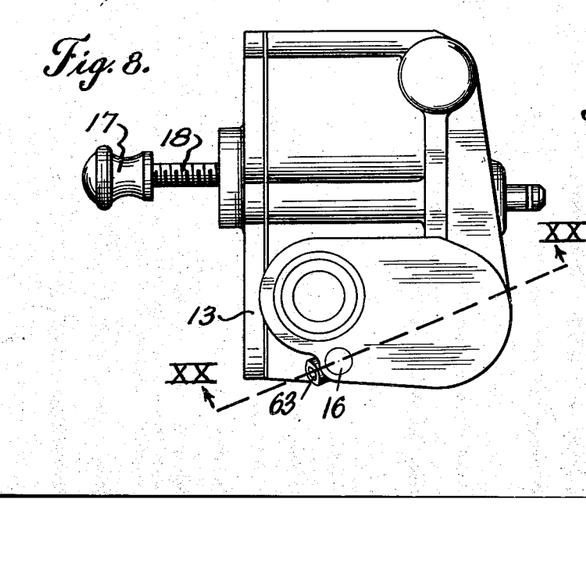
Figure 8 is a right side elevational assembly of the power unit.
Figure 9:
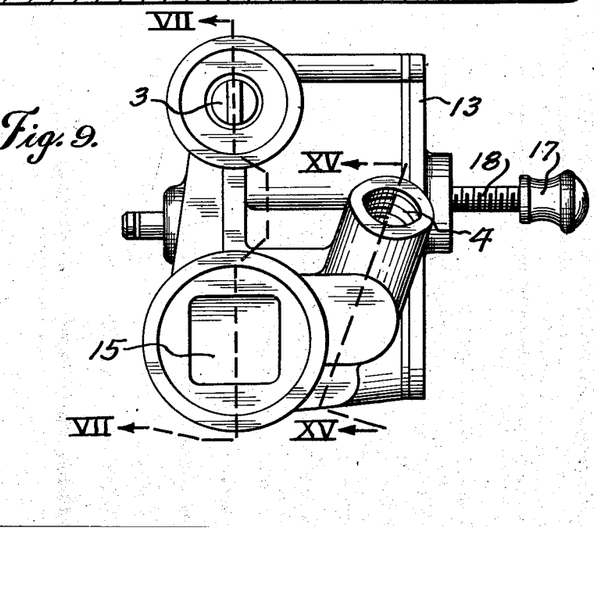
Figure 9 is a left side elevational assembly thereof, said right and left being taken in both cases as the same appear in Figure 4.

Power unit 2 has detachably engaged cover 13, also plugs 14, 15, and 16, (Figs. 7 and 20) and it follows that all actuating elements of the invention are within the unitary housing of said power unit with the exception of knob 17 and shaft 18 (Fig. 8).

Power unit has chamber 19 (Fig. 7) arranged so as to intersect with cylinders 20 and 21. Cylinder 20 has piston ram 22 therein and each end of said piston is provided with head 22A, said heads are adapted to snugly engage cylinder 20. One end of said cylinder is threaded so as to receive plug 15 which closes said cylinder as shown.

Chamber 21 is oppositely disposed and one portion thereof is adapted to receive head 3A of power transmitting member or ram 3. The remaining portion of chamber 21 is somewhat larger than the first-named portion and similarly larger than power transmitting member or ram 3 so as to allow space therein for oil passage, and the extreme end of said chamber is still more enlarged so as to accommodate detachably engaged plug 14, spring 23, pressure washer 24, and packing 25 as shown.

Chamber 19 (Fig. 15) is disposed intermediate cylinders 20 and 21 with the bottom slightly flattened as at 19A, said chamber is also provided with opposed grooves 19B so as to snugly receive valve shifter carriage 48. Precisely at the radial center of chamber 19 (Fig. 6) is boss 19C retaining counterbore 27A and stud 27, which latter is adapted to retain lock washer 28, gear 30 and washer 51, as well as to provide mounting for pin 52 of actuator 45.

Figure 6:
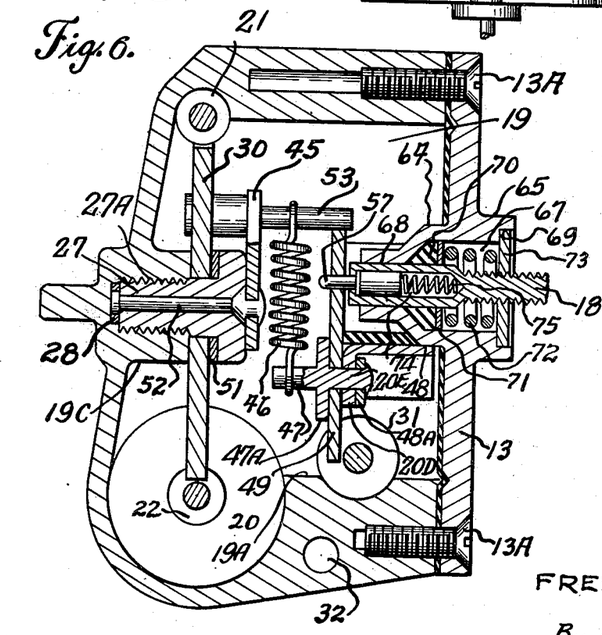
Figure 6 is an enlarged section taken directly upon line VI—VI of Figure 4 and looking in the direction of the arrows.
Figures 14, 15:
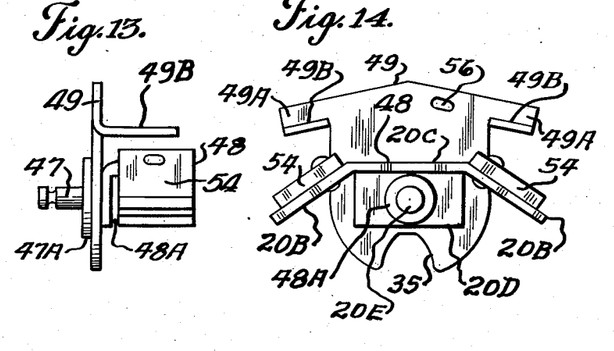
Figure 14 is a front elevation thereof.
Figure 15 is a sectional view taken upon line XV—XV of Figure 9 and looking in the direction of the arrows.
Figure 15:
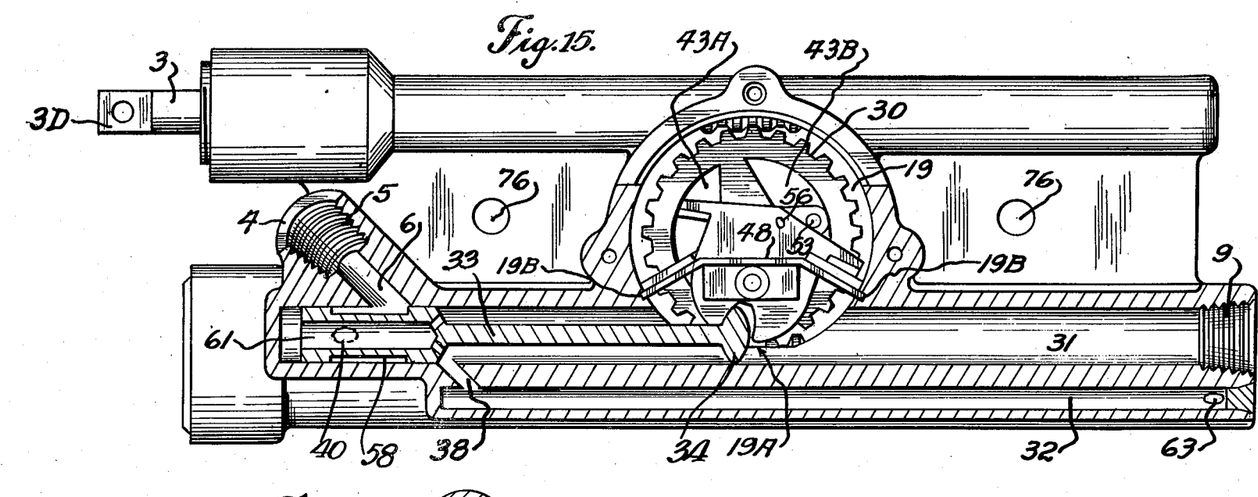
Figure 16:
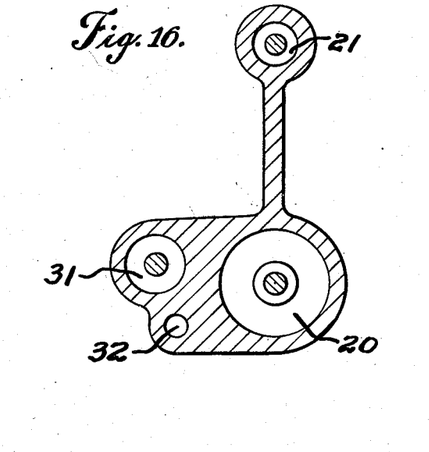
Figure 16 is an enlarged section taken upon line XVI—XVI of Figure 4 and looking in the direction of the arrows.

Chamber 31 is positioned parallel to cylinder 20 of said power unit and at one side thereof as shown in Figures 6, 15 and 16. This chamber houses the valve unit 58 and is accordingly positioned, with respect to the valve shifter 49 (Fig. 6), so that sector 35 engages valve knob 34 of valve 58 within said chamber 31. Chamber 32 is similarly positioned parallel to the cylinder 20 of the power unit and at one side thereof as shown in Figures 6, 15 and 16. This chamber provides oil communicating means from the portion of chamber 31 which houses the valve head to port 63 and thence into the right hand end of cylinder 20 (Fig. 15).

Chamber 31 connects at 9 with exhaust line 8, and at 4 and 5 with pressure line 7.

Figures 17, 18, 19, 20, 21:
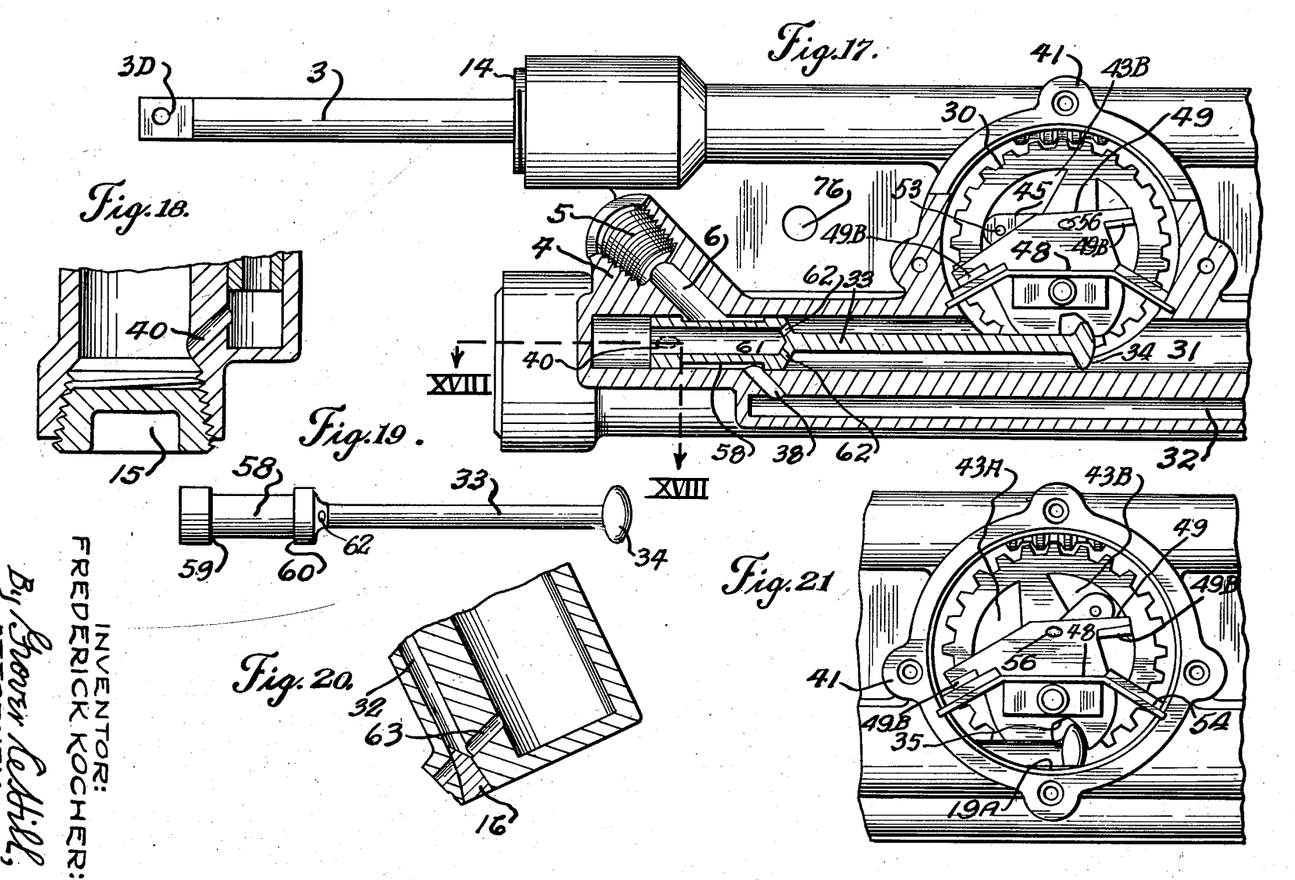
Figure 17 is a partial sectional view similar to Figure 15, but showing the mechanism in a changed position.
Figure 18 is a section taken upon line XVIII—XVIII of Figure 17.
Figure 19 is an elevation of alternative valve removed from housing.
Figure 20 is a section taken upon line XX—XX of Figure 8.
Figure 21 is a partial sectional view similar to Figure 17, but showing the mechanism in a changed and parking position.

To the left of chamber 32 is port 38 which connects chambers 31 and 32 for oil passage therebetween under pressure or suction subject to the valve position indicated in Figures 15 and 18.

Port 40 (Figs. 17 and 18) is positioned at the left of chamber 31 so as to make communication with left side of chamber 20. Port 40 serves for the same purpose as port 63 except that it feeds oil under pressure or suction to and from the left side of chamber 20 subject to relative valve position.

Figure 5:
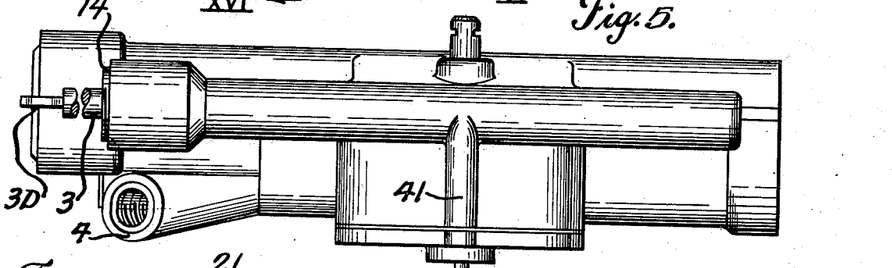
Figure 5 is a top plan assembly of the power unit.

Bosses 41 (Figures 4 and 5) are for the accommodation of a series of tapped holes for cover screws 13A where indicated.

It should be noted in connection with the construction of this housing and the location of chambers, cylinder and ports therein, that the construction is peculiar and has the definite advantage of permitting the housing to be cast all in one piece, and closed by only the plate 13 bolted thereon. All other known forms of motors of this type require housings which must be cast in more than one piece. The hereindisclosed motor and housing are such that said housing may be cast in one piece, with chamber 19 and the boss therein being created at the time of casting said housing and then the other chambers and cylinder and ports therebetween may all be provided by simple drilling. This provides a more economical and sturdy construction and more simple assembly.

Figure 10:
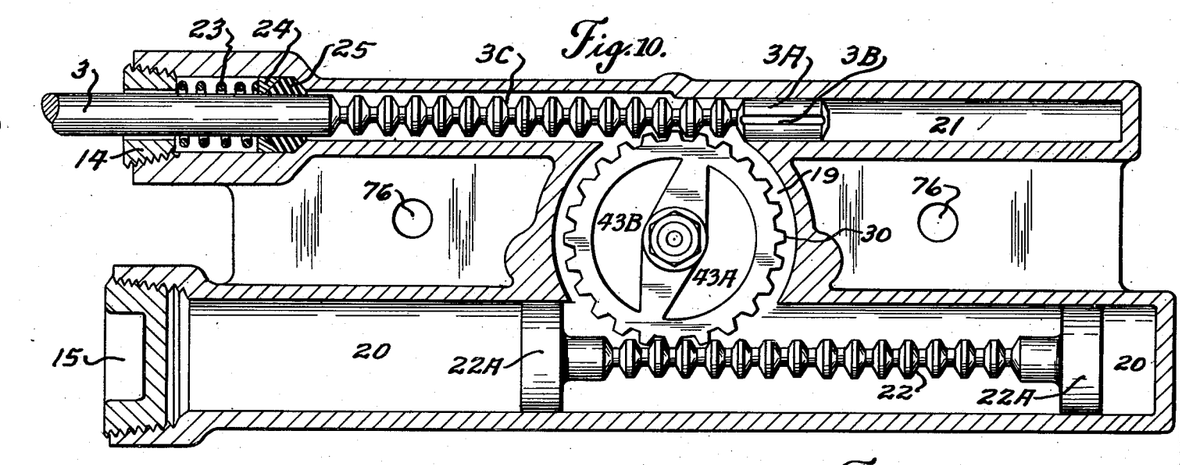
Figure 10 is a longitudinal section taken upon line VII—VII of Figure 9 and looking in the direction of the arrows showing the mechanism in a changed position from that indicated in Figure 7.

Power transmitting member 3 is within chamber 21 and has head 3A so as to properly engage said chamber as shown in Figure 10. The grooved portion of power transmitting member 3 permits passage of oil past same through longitudinal groove 3B within head 3A of power transmitting member 3. The opposite end portion of ram 3 is adapted to snugly coact with washer 24.

The outer end of power transmitting member 3 is provided with aperture 3D for detachable engagement with lever N (Figure 1).

Both the piston 22 and power transmitting member 3 in the portions at which they respectively engage the gear 30 are formed in what may be for convenience termed circular grooved formation. By this, the teeth for engaging the gear, instead of being flat as in an ordinary rack, go all the way around said portion of said piston and power transmitting member at a constant distance from the respective longitudinal center lines thereof. By this construction, the resistance of said members to turning around their longitudinal axes is eliminated and said members permitted to turn. This tendency to turn is inevitable in both pieces. In the piston the swirling of the pressure fluid in entering creates a rotating impulse. In the power transmitting member, irregularities in construction of the mechanism to be driven makes slight turning for compensation desirable. Thus a desirable flexibility in the power transmitting member is secured and the need for guides or bearings to prevent turning in the piston is eliminated. This provides obvious advantages in ease and simplicity of construction and elimination of parts which might wear out and cause trouble.

Packing 25, washer 24, spring 23 and plug 14 are suitably nested within the enlargement of chamber 21 so as to retain ram 3 in the proper alignment with said chamber and being thereby leakproof as shown.

Gear 30 is adapted to mesh with the circularly grooved portion of rams 3 and 22 and has open space 43B therein so as to allow engagement of pin 53 of actuator 45 with said gear so as to time the movement of the same until at such time that the actuator has reached dead center upon its axis.

Actuator spring 46 anchored to pin 47 upon valve shifter carriage and pin 53 upon actuator unit 45 is energized and will pull actuator 45. Pin 53 has a portion thereof extended past arms 49A of shifter member 49 (Figure 14) so as to force said member at increased gear speed to its relative position to alternate the valve from the position to change piston stroke, as clearly indicated in Figures 15 and 17.

Gear 30 is mounted upon threaded stud 27, also friction reducing washer 51 as shown, and said stud threadedly engaging the housing of the power unit as shown in Figure 6, and snugly abuts lock washer 28, leaving gear 30 and washer 51 free to rotate.

Figure 11:
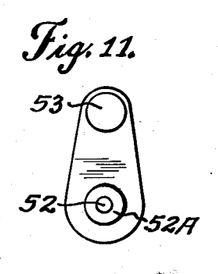
Figure 11 is an end elevation of the valve shifting actuator.
Figure 12:
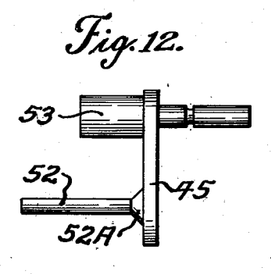
Figure 12 is a side elevation thereof.

Referring more particularly to Figures 11 and 14 inclusive, it follows that the actuator comprises central member 45 which carries pivoting pin 52 which is permanently fixed with member 45. Pin 52 has tapered head 52A sized so as to snugly engage longitudinal bore in stud 27. Pin 53 is also permanently fixed with member 45 and is positioned thereon for proper engagement with portions 43B of gear 30. Portion 43A serves no purpose except reducing weight of gear.

Again referring to Figures 13 to 14 inclusive, the shifter 49 comprises a carriage 48 having arms 20B permanently engaging opposed slots within the power unit housing (Figures 15 and 17), and it follows that portion 20C of arm 20B is disposed well below the center of gear 30. Portion 20C has depending portion 20D which has a hole 20E to receive pin 47 with shifter 49 and washer 48A as shown.

Pin 47 has shoulder 47A so as to retain shifter 49, and said pin is sized so as to allow shifter 49 on carriage 48 to pivot freely. Each of arms 49A on shifter 49 is provided with tab 49B and said tabs are sized so as to abut silent pads 54 upon portion 20B of the carriage 48.

Segmental slot 35 is provided within the shifter 49 where knob 34 on stem 33 is constantly engaged within said slot in all valve positions as shown in Figures 15, 17, and 21.

Carriage assembly 48 with shifter 49 placed within housing slots 19B shown in Figure 15 holds center of pin 47 at vertical center line of stud 27 but far below horizontal center line of said stud, this location effects maximum leverage upon slot 35 in shifter 49 when actuator pin 53 contacts arms 49A on said shifter, as illustrated in Figures 6, 15, 17 and 21.

Elongated aperture 56 is provided in the shifter 49 to one side of the vertical center line thereof, depending upon the position of parking of wiper plates Q. Said aperture is sized and located so as to follow the arc as projected upon the shifter 49 by stop pin 57 as the said shifter moves into the parking position shown in Figure 21, from a position shortly prior thereto.

Valve 58 as shown in Figure 19 has different diameters as indicated and the longitudinal length between said parts of different diameters is determined by the position of ports 6 and 38 (Figures 15 and 17). The diameter between edges 59 and 60 of valve 58 is greatly reduced so as to allow pressure fluid, such as oil, to enter chamber 31 within housing and between said edges 59 and 60 on valve 58 (Figures 15 and 17) and arranged so that said region in chamber 31 between edges 59 and 60 will be in constant communication with feed port 6.

Counterbore 61 within valve 58 is in constant communication with full length of chamber 31 except aforesaid area between edges 59 and 60 by means of ports 62 shown in Figure 17, said chamber 31 being under constant suction forces supplied by pump B of the vehicle when engine A is in motion.

Figure 15 shows the valve in opposite position to Figure 17 and port 38 in communication with chambers 31 and 32 for retracting deenergized fluid out of the right side of cylinder 20 by means of port 63 in chamber 32 while port 40 is open to region in chamber 31 between edges 59 and 60 on valve 58, so as to receive energized fluid from port 6.

As previously described, knob 34 of valve 58 is adapted to engage slot 35 of the shifter unit, and said slot is somewhat larger than said knob so as to prevent wabbling of said knob with respect to said slot and also preventing binding of the elements.

Referring more particularly to Figure 6, housing cover 13, bosses 64 and 65 accommodate chamber 67 also bore 68 and counterbore 69, the center of said bosses and chamber including bore aligns with slot 56 (Figure 14) when shifter 49 is in its parking position. Said chamber and counterbores are of adequate proportion so as to nest the control shaft assembly, which comprises shaft 18, knob 17, packing 70, washer 71, spring 72, and outer washer 73. Packing 70 is of a conical formation as shown in Fig. 6 and fits around a portion of the control shaft 18 and nestles snugly into a corresponding convexly conical portion of chamber 67 in boss 64. Washer 71 rests against packing 70 to provide a seat for spring 72 which surrounds the shaft 18 and rests at one end against washer 71 as aforesaid and at the other end against washer 73. Washer 73 is press fitted into an accommodating recess in boss 65 and then the edges of said recess are peened down to hold washer 73 securely in place. In this way, packing 70 is always held tightly against shaft 18 and the sides of chamber 67 in boss 64 to prevent the leakage of oil from the interior of chamber 19 outward along said control shaft 18.

Shaft 18 is adapted to slide freely within bore 68. Shaft 18 is enlarged at its inner end and said enlarged portion has blind bore 74 therein, said blind bore retains large portion of pin 57 with spring 75 therebehind. Said spring allows pin 57 to retract when control knob 17 and shaft 18 are moved inward of chamber 19 by which shaft 18 is placed in parking position. When slot 56 comes into line with said pin, the front end of pin 57 slides upon shifter 49 and snaps into slot 56. Said pin 57 and spring 75 within blind bore 74 are held within shaft 18 by peening front edge of said shaft to reduce the diameter of blind bore thereof at its front end.

When the centers of pin 57 and slot 56 meet, wiper plates Q are parked, or moving to said position.

It may be noted that shaft 18 threadedly engages washer 73 so that this shaft will not be affected by the suction within chambers 19 and 31 and to hold said shaft 18 in any adjusted position.

The details of construction of the complete invention having been set forth in the several preceding paragraphs, the precise manner in which the same operates follows:

When the engine A is started, the oil pressure at once rises to its operating point and thus provides an immediate operating pressure in pressure line 7 and a corresponding suction in return line 8. Thus the device is ready for immediate operation and its effectiveness does not change during the operation of the engine, as when the engine is pulling under a heavy load.

Figure 21 shows the parking position of the device from the side and Fig. 6 clearly shows the pin 57 thrust through the hole 56 of shifter 49. This pin thus holds the valve shifter 49 motionless. When the pin 57 is withdrawn by screwing back shaft 18, the valve shifter 49 is free to move and spring 46 which is already under tension (which condition it reaches in a manner hereinafter to be described), pulls actuator 45 down against the righthand part 49A of valve shifter 49 (Figs. 14 and 21) and turns said valve shifter clockwise until the righthand part 49B of shifter 49 strikes righthand pad 54 thereof. This clockwise movement of shifter 49 moves the sector 35 and knob 34 leftward and thus moves valve 58 into the position shown in Fig. 15.

In this position oil entering under pressure through port 6 travels around the reduced diameter portion of valve 58 and through port 40 into the lefthand end of cylinder 20. The pressure thus applied moves piston 22 rightward (Fig. 7). As piston 22 moves rightward it engages gear 30 and causes it to rotate counterclockwise. Gear 30 also engages the grooves 3C of power transmitting member 3 and moves said power transmitting member outward or leftward to actuate the wiper plates Q through elements K and P of Fig. 1. As piston 22 moves rightward, the oil in the righthand side of cylinder 20 flows out through port 63 into chamber 32 to port 38 and thence into chamber 31 from whence it is led out at 9 into pipe 8 and back to the suction side of pump B through loop 10. Also, as piston 22 moves rightward and gear 30 moves counter-clockwise, the part 53 of actuator 45 is at first not engaged by any portion of said gear but open place 43B of said gear 30 moves freely past part 53. But as said gear reaches the position shown in Fig. 15 the solid portion thereof following said open place 43B engages part 53 and carries it along in counter-clockwise movement. This movement being at first upward as well as leftward, the spring 46 being fastened to element 53 is elongated and thus placed under tension. As the counter-clockwise movement of gear 30 and actuator 45 continues more and more tension in spring 46 is created until part 53 of actuator 45 reaches a point vertically above and in line with the center of rotation of actuator 45 which is at point 52. At this point spring 46 is at maximum tension. As gear 30 and actuator 45 continue to move counter-clockwise and element 53 accordingly moves on leftward, the point of dead center is past and spring 46 snaps element 53 and actuator 45 downward and ahead through open space 43B until element 53 strikes lefthand part 49A of shifter 49, whereupon shifter 49 is rotated counter-clockwise until the lefthand element 49B strikes the lefthand pad 54 of carriage 48. By this movement of shifter 49 the sector 35 and valve knob 34 are moved rightward to place valve 58 in the position shown in Fig. 17. By this time the piston 22 has reached a position shown in Fig. 10.

Oil under pressure from port 6 now flows around the reduced diameter portion of valve 58 and through port 38, port 40 being now closed, into chamber 32 whereupon it is led to port 63, thence into the righthand end of cylinder 20 to urge said piston 22 leftward.

As piston 22 moves leftward it rotates gear 30 clockwise and said gear engages grooves 3C of power transmitting member 3 to move said power transmitting member inward or leftward to actuate the wiper plates Q in the opposite direction.

As piston 22 moves leftward, oil in the lefthand end of cylinder 20 is now cut off from the pressure source and is entirely deenergized. It moves out port 40 into the extreme lefthand end of chamber 31 and thence through counterbore 61 through ports 62 and into chamber 31 whereupon it flows out at 9 into pipe 8 and thence to the suction side of pump B through loop 10.

As piston 22 moves leftward and gear 30 moves clockwise, the part 53 of the actuator 45 is at first not engaged by any part of gear 30 and open place 43B moves freely past part 45. Then when the piston 22 has completed a part of its movement leftward, the solid part of gear 30 which follows open place 43B engages part 53 and carries it along with it upward and to the right.

Thus the cycle is reversed. Spring 46 is again elongated and placed under tension which becomes maximum when part 53 is vertically above part 52. As gear 30 and part 53 continue moving rightward and 53 moves past the dead center position, spring 46 snaps part 53 and actuator 45 ahead and downward through open space 43B until element 53 strikes the righthand part 49A of shift 49, whereupon shifter 49 is rotated clockwise until the righthand element 49B strikes the righthand pad 54 of carriage 48. By this movement of shifter 49, the sector 35 and valve knob 34 are moved leftward to place valve 58 in the position shown in Figure 15. Thus oil again flows from port 6 into port 40 and the cycle is repeated.

When it is desired to stop the device, knob 17 is turned to screw part 18 through washer 73 and inward. This presses pin 57 against shifter plate 49 in whatever position shifter 49 may be and compresses spring 75. As soon as shifter 49 moves to bring opening 56 into alignment with pin 57, the urging of spring 75 pushes pin 57 into hole 56. This holds the shifter and hence the valve from movement so that the whole device stops until the pin 57 is again withdrawn by screwing part 18 outward.

It will be noted that in the parking position the valve directs oil under pressure into the right side of cylinder 20. This moves piston 22 leftward and as above described in detail, moves part 53 and actuator 45 from left to right. Spring 46 is elongated and placed under tension and as it passes dead center it snaps downward and forward through space 43B, in the manner above described. However, when it strikes part 49A of shifter 49 and the said shifter fails to move, being held by pin 57, it is held with the spring under tension in the position shown in Fig. 21. This is the position from which movement is again started in the manner above set forth upon withdrawing pin 57 from hole 56 by screwing part 18 outward.

It will be noted also that the parking position of the shifter may be placed in any position by the positioning of hole 56 of shifter 49.

In conclusion it should be understood that the disclosure herewith is merely illustrative so as to illustrate the principle desired to be protected by Letters Patent, and any modification of the invention that may become necessary during any probable further development of the same for the market, would consistently fall within the scope of the claims.

Having thus fully described my invention, what I claim as new is:

1. In a windshield wiper motor unit in combination with the lubricating system of an internal combustion engine, means whereby the deenergized operating fluid from said motor unit returns to the low pressure side of said lubricating system through a loop passage arranged to conduct said operating fluid at one point to a horizontal level lower than the horizontal level of the point of connection with the said low pressure side of said lubricating system.

2. In a windshield wiper having wiper blades and a mechanism for driving said wiper blades including a housing, a chamber within said housing which chamber is closed at one end, a gear adapted for rotary motion arranged partly within said chamber, means to impart a reciprocating rotary motion to said gear, means operatively to associate said wiper blades to the hereinafter mentioned power transmitting member, and means associated with said housing and providing a fluid tight seal around said power transmitting member at the end opposite the closed end of said chamber; the characteristic feature of a power transmitting member slidably but snugly arranged within said chamber for engagement with said gear and characterized by having a head on the end nearest the closed end of said chamber which fits closely but slidably within said chamber and has a longitudinally aligned passageway therethrough in order to allow fluid to pass from one side to the other of said head.

3. In a windshield wiper power unit having a housing, driving means and driven means therein, a chamber in said housing, a gear having openings therein arranged in said chamber and in constant operative engagement with both of said means, a valve unit, lever means associated with said valve unit for shifting same; the characteristic feature associated therewith of a unit for actuating said lever means comprising an actuator pivoted at one end to the said housing, provided at the other end with a pin in loose engagement with said gear at said openings therein and further provided at the last named end with a pin oppositely directed from said first named pin and arranged in operative engagement with said lever means for shifting said valve and a spring affixed at one end to said last named pin, and at its other end to a point fixed with respect to said housing and located below the point of pivot of said actuator to reach a maximum tension as said actuator is in position vertically above its pivot point and then to snap said lever forward and downward as said actuator moves past said position vertically above its pivot point whereby the aforesaid valve shifting means is actuated.

4. In a windshield wiper power unit having a housing, driven means therein, driving means therein, a chamber in said housing intermediate said foregoing means and a gear arranged in said chamber in constant operative engagement with both of said foregoing named means, a valve unit, an actuator unit operable by said gear and a spring to provide a sudden impact against the hereinafter mentioned valve shifter unit; the characteristic feature associated with said foregoing elements of a valve shifter unit including a carriage portion mounted upon and within said housing, an elongated element pivoted near its middle upon said carriage and in a plane of rotation parallel to said gear and provided at one end thereof with means for engaging means for transferring motion from said shifter to said valve and provided at the other end thereof with portions extended laterally on each side thereof and adapted to receive impact from aforesaid actuator means, whereby said shifter moves as a lever on its pivot point and engages said valve means to move the same from one position into another position.

5. In a windshield wiper power unit having a housing, driving means and driven means located therein, a chamber in said housing, and a gear arranged therein in engagement with said driving and driven means, and a valve unit; the characteristic feature associated with said foregoing elements of a control mechanism for moving said valve in accordance with changes in position of said driving means including an actuator comprising a vertical lever pivoted at one end to the housing aforesaid and provided at the other end with a pin in loose engagement with said gear at openings therein and further provided at the same end with a pin oppositely directed from said first named pin and arranged in operative engagement with the shifter means hereinafter described and a spring fastened at one end to a point fixed with relation to said housing and below the pivot point of said lever member of said actuator and at the other end to said lever member at a point above said pivot point so that said spring is placed under tension as said lever rotates around said pivot point to reach a maximum tension as said lever is in a position vertically above its said pivot point, and further including a shifter unit comprising an elongated element pivoted near its middle upon said carriage and held in a plane of rotation parallel to said gear and provided at one end thereof with means for engaging means for transferring motion from said shifter to said valve and provided at the other end with portions extended laterally on each side thereof and adapted to receive impact from aforesaid actuator means, whereby when said actuator element is moved near the end of a stroke of said driving means, said spring is placed under tension until said actuator element passes its vertical dead center position and then said spring snaps the actuator forward and downward to engage and move said shifter element to move said valve.

6. In a fluid motor having a housing, driven means therein, a cylinder therein, and a reciprocating piston arranged within said cylinder and operatively connected to the driven means, a valve and a source of fluid under pressure; the characteristic feature of a means for operating said valve including a rotatable element operably associated with said piston to rotate in relationship to the reciprocation of said piston, an open space within said rotatable element, an actuator pivoted to rotate in a plane parallel to that of said rotatable element and adapted at a point remote from its pivot point to extend into the open space in said rotatable means, the arcuate distance of said opening being great enough to permit substantial movement within same by the engaging means of said pivoted element, means arranged to be placed under tension by partial rotation of said actuator and to be enabled to snap said actuator ahead through the opening in said rotating element upon further rotation of said actuator, means upon said actuator to engage and move the hereinafter described lever means in association with movement of said actuator, and lever means to transmit the movement of said actuator to said valve to effect movement thereof.

7. In a windshield wiper power unit having a housing containing driving and driven parts of said power unit including valve shifting means in said housing, said parts including a plate moving in arcuate reciprocation and having an arcuate slot therein; means for effecting manual control thereof comprising a shaft arranged at one end for hand manipulation thereof and threadedly inserted into said housing opposite and perpendicular to said plate and positioned to align the axis extended of said shaft with said arcuate slot, means to effect a liquid tight sealing of said shaft but to permit same to be freely screwed inwardly or outwardly, and the opposite end of said shaft having a recess in a plunger and a resilient means located therein, and means to prevent said plunger from moving entirely out of said recess, whereby said plunger in one position of said plate as said shaft is screwed inward, will withdraw into said recess and compress said resilient means, and in another position of said plate said plunger will move forward in response to said resilient means and enter said slot in said plate whereby said plate in said valve shifting means is prevented from further movement and the power unit is stopped.

8. In a fluid motor having a housing and a plate moving in arcuate reciprocation in association with valve shifting mechanism of said motor, means for stopping or starting said motor comprising the provision of an arcuate opening in said plate and a pin arranged in line with said opening perpendicular to said plate and provided with resilient means for moving said pin inward into said hole to stop said motor and manually actuated means for moving it outward out of said hole to start said motor.

9. In a fluid motor having a housing, driving and driven means therein, said first named means including a cylinder, a piston in said cylinder, a valve, passageways for pressure fluid and valve shifting mechanism including a lever means arranged to engage the said valve; the characteristic feature of a long passageway in said housing communicating with said pressure fluid passageways, a valve snugly but slidably fixed within said passageway and arranged at one end to engage said lever means and arranged at the other end thereof to be in fluid tight, slidable, relationship with said passageway both at the end thereof and at a point spaced from the said end, leaving a space therebetween to permit the passage of fluid around said valve, and said valve having a recess at its last-named end and provided with passageways from within said recess to the outside of said valve at a point between the second of the above mentioned fluid tight but slidable points of said valve and the first named end thereof.

10. In a fluid motor adaptable to driving a windshield wiper and having a housing, a cylinder therein, a piston within said cylinder, means operable from said piston to utilize the power developed thereby, a source of fluid under pressure; the characteristic feature of means to control the inlet and the outlet of operating fluid from the respective ends of said cylinder including the provisions of a slidable valve having a constricted portion and two parallel chambers both of which are long with respect to their diameters and of which one contains the said valve in snug but sliding relationship, a port in the valve containing chamber opposite the constricted portion of said valve for the inlet of energized operating fluid, a port providing communication in one position of said valve from said inlet port to one end of said cylinder, a port providing another position of said valve communication from said inlet port to the other of said chambers, each of said ports being so arranged with said valve that when energized operating fluid is flowing into one deenergized fluid may flow out from said cylinder by the other, and the said other of the two aforesaid chambers being in communication at one end with the first named of said two chambers at a portion thereof adjacent said valve by the second above named port and at the other end with the said other end of said cylinder.

11. In a fluid motor adaptable to driving a windshield wiper and having a housing, a cylinder therein, a piston within said cylinder, means operable from said piston to utilize the power developed thereby a source of fluid under pressure; the characteristic feature of means to control the inlet and the outlet of operating fluid from the respective ends of said cylinder including the provision of a valve and actuating means therefor and two parallel chambers both of which are long with respect to their diameters and wherein said valve is positioned slidably within one of said chambers and comprises a valve stem having on one end thereof means for engaging said actuating means and having on the other end thereof an enlarged portion fitted snugly but slidably to the interior of said chamber at two spaced portions thereof providing a fluid conducting constriction therebetween and having a recess in said enlarged portion with ports for communication from said recess to said chamber wherein said valve is positioned through a portion of said valve located stemward of the nearest portion of said valve which is snugly fitted to said chamber as aforesaid, and said chamber being connected with outlet means for deenergized operating fluid at its end remote from said enlarged portion of said valve and with inlet means for energized operating fluid at a portion thereof adjacent said constriction of said valve in all positions thereof, a port providing communication from said chamber to one end of said cylinder which port is so positioned in said chamber that in one position of said valve it communicates with said constricted portion of said valve and in the other position of said valve it communicates with the portion of said chamber which is open to the said recess in said valve, and a port providing communication from said chamber to the other of the two chambers aforesaid which port is so positioned in the first of said chambers that in the first above named position of said valve it communicates with said chamber stemward from the enlarged portion of said valve and in the second above named position of said valve it is adjacent the constricted portion of said valve, and said second named chamber communicates by the last mentioned port at one end with the first named chamber and at the other end with the end of said cylinder remote from that above mentioned.

12. In a fluid motor adaptable for driving a windshield wiper having a housing, a piston therein, a power transmitting member, a gear operably connecting said piston and said power transmitting member and means for creating a pressure on alternate sides of said piston to cause reciprocation thereof, the characteristic feature of providing said piston in the portion thereof engaging said gear with circumferential parallel circular grooves adaptable for meshing with the teeth of said gear, whereby slight rotation of said piston under the impact of swirling operating fluid is permitted and guiding bearings for said piston are eliminated.

13. In a fluid motor adaptable for driving a windshield wiper having a housing, a piston therein, a power transmitting member, a gear operably connecting said piston and said power transmitting member and means for creating a pressure on alternate sides of said piston to cause reciprocation thereof; the characteristic feature of providing said power transmitting member in the portion thereof engaging said gear with circumferential, parallel, circular grooves adaptable for engaging the teeth of said gear, whereby slight rotation due to irregularities in connecting mechanism to be driven by said motor becomes immaterial and guiding bearings for said member and rotatable joint connections for such driven mechanism are eliminated.

14. In a fluid motor adaptable for driving a windshield wiper having a housing and means contained therein for reacting to fluid pressure, wherein said means may be stopped by thrusting a rod into a portion thereof, and a member adapted to receive such a rod, and a rod adapted to cooperate therewith and capable of being moved inwardly or outwardly to control the operation of said motor; the characteristic feature of means for packing in liquid tight manner said rod at point of entry into said housing comprising a chamber adapted for passage therethrough of said rod and having a convexly conical inner end, a packing around said rod and shaped to rest snugly against same and said conical end, a spring around said rod and resting at one end against said packing and means at the outer end of said chamber to hold said spring by its other end under tension against said packing.

15. A housing for a windshield wiper motor comprising a body having a tubular chamber in the top thereof, a tubular cylinder near the bottom thereof, two tubular chambers near the bottom thereof in close proximity to each other and to said cylinder but arranged so that neither shall lie directly between the other one and said cylinder, all of said chambers and said cylinder lying parallel with each other, and a substantially rectangular chamber open on one side but adapted to be closed by a plate affixed thereto and provided on its closed side with a boss adapted for mounting the internal mechanism of said motor, said chamber lying intermediate the chamber at the top of said housing and the cylinder and communicating in a wide portion with said top chamber intermediate the two ends thereof and in a wide portion with said cylinder and one of the two bottom chambers intermediate the ends of each thereof, whereby the housing with the central rectangular chamber therein may be cast in one piece and the other chambers and cylinder and passages therebetween may be easily provided by drilling.

16. A fluid pressure windshield wiper motor having in combination a housing provided with a tubular chamber longitudinally in the top thereof and a cylinder parallel to said chamber near the bottom thereof and two tubular chambers parallel to said cylinder near the bottom thereof adjacent said cylinder, and a rectangular chamber intermediate said cylinder and said tubular chamber near the top of said housing and communicating in a wide portion with each of said chambers near the top of said housing and with said cylinder and with one of said tubular chambers adjacent said cylinder, said housing being also provided with ports between said cylinder and tubular chambers adjacent thereto to provide for the passage of pressure fluid therebetween, the one of said tubular chambers adjacent said cylinder which is not in communication with said rectangular chamber being adapted to provide communication from one end of the other of said tubular chambers to a remote end of said cylinder, a double-ended piston in said cylinder having gear engaging means intermediate said ends, a power transmitting means located within said tubular chamber near the top of said housing provided with gear engaging means and operatively connectible with means for transmitting power from said member to windshield wiper means, a gear mounted upon said housing within said rectangular chamber and operatively associated with said power transmitting means and with said piston, valve actuating means within said rectangular chamber and operable from said gear to effect movement of a hereinafter mentioned valve near the end of each piston stroke, a slidable valve located within the one of above mentioned tubular chambers adjacent said cylinder which communicates with said rectangular chamber and so located with reference to ports opening into said chamber wherein said valve is located that reciprocation of said valve will control flow of operating fluid to cause reciprocation of said piston, means for connection to a source of energized operating fluid and means for escape of deenergized operating fluid.

FREDERICK KOCHER.